US005746420A

United States Patent [19]

Kohlert

[11] Patent Number: 5,746,420

[45] Date of Patent: May 5, 1998

[54] CLAMPING DEVICE FOR SECURING A FIRST COMPONENT, SUCH AS A TOOL, TO A SECOND COMPONENT

[76] Inventor: Rudolf Kohlert, Danziger Strasse 3, 63811 Stockstadt, Germany

[21] Appl. No.: 701,047

[22] Filed: Aug. 21, 1996

[30] Foreign Application Priority Data

Aug. 30, 1995 [DE] Germany ........................ 195 31 889.7

[51] Int. Cl.$^{6}$ ........................................................ B23Q 3/08

[52] U.S. Cl. ................................................................ 269/32

[58] Field of Search ................................. 269/20, 22, 27, 269/32, 35, 134, 136–138, 217, 229, 233, 234, 24

[56] References Cited

U.S. PATENT DOCUMENTS

| | | | |
|---|---|---|---|
| 3,578,306 | 5/1971 | Smith | 269/22 |
| 3,595,112 | 7/1971 | DeGeorge | 269/137 |
| 3,700,227 | 10/1972 | Sessody | 269/32 |
| 4,506,871 | 3/1985 | Yonezawa | 269/234 |
| 4,932,640 | 6/1990 | Shirakawa | 269/32 |
| 5,181,700 | 1/1993 | Yonezawa | 269/138 |

FOREIGN PATENT DOCUMENTS

| | | | |
|---|---|---|---|
| 1478857 | 1/1970 | Germany . | |
| 3802985 | 8/1988 | Germany | 269/20 |
| 1004068 | 3/1983 | U.S.S.R. | 269/32 |

*Primary Examiner*—Robert C. Watson

*Attorney, Agent, or Firm*—W. G. Fasse; W. F. Fasse

[57] ABSTRACT

A clamping device for holding, for example a work piece in a machine tool, has a housing with a cylindrical bore and a clamping piston with a dead-end cavity axially slidable in the housing. A clamping lever extends through a ball-bushing with an inner end into the dead-end cavity of the piston and with an outer end carrying a clamping head out of the housing. The inner piston end has a first slanted surface that cooperates with a correspondingly slanted second surface rigidly held in the cavity of the piston. A guide and stop pin also rigidly mounted in the piston cavity cooperates with a recess in the clamping lever to guide an axial movement of the lever relative to the piston and to facilitate a pivoting movement of the lever about the center of the ball-bushing, but simultaneously preventing or stopping a relative rotation between the piston and the lever. Such a structure can be adjusted to apply the clamping force in any direction in a plane extending perpendicularly to the longitudinal axis of the clamping device.

15 Claims, 3 Drawing Sheets

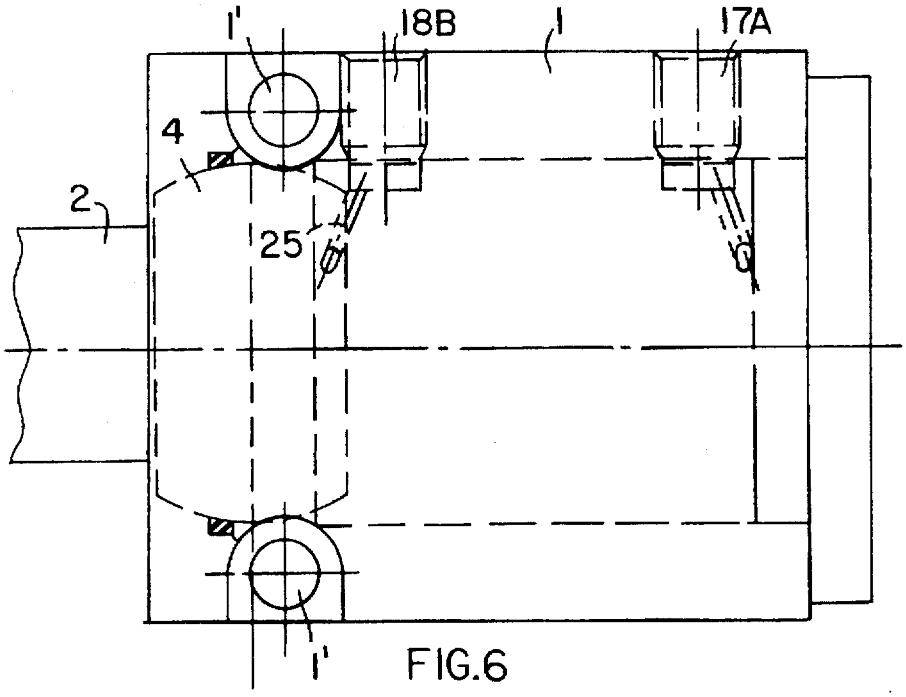
FIG.6
FIG.7
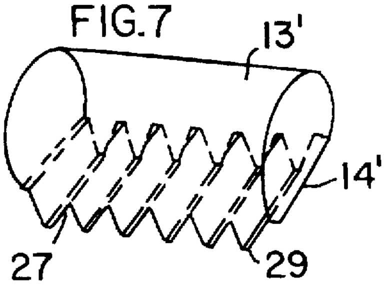
FIG.7A
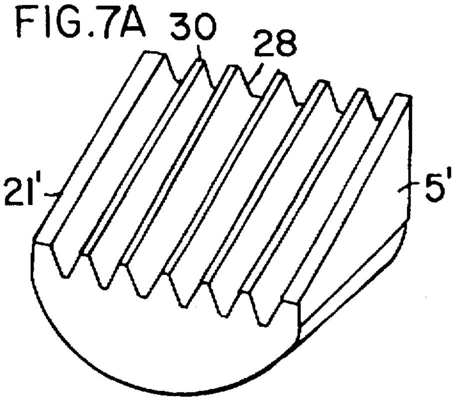
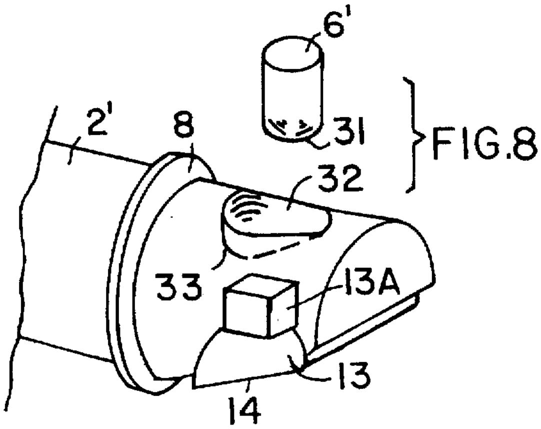
FIG.8

CLAMPING DEVICE FOR SECURING A FIRST COMPONENT, SUCH AS A TOOL, TO A SECOND COMPONENT

FIELD OF THE INVENTION

The invention relates to a clamping device for securing a first component to a second component. The first component may, for example be a work piece, a tool, a mold or the like. The second component may, for example be a machine table, a jig, a pallet, or the like. The clamping is accomplished by a clamping lever which is first moved into a position for engaging the first component and then pressed substantially vertically onto the first component.

BACKGROUND INFORMATION

It is necessary to secure a work piece in a machine tool in a fixed and precisely located position for performing a machining operation on the work piece. The securing must be accomplished in such a way that the work piece will remain in its fixed position regardless of the machining forces applied to the work piece. Conventionally, clamping levers are used for the application of the clamping force and each clamping lever is part of a clamping device. It is generally desirable that the clamping devices are as small as possible to take as little space as possible on the second supporting component to which the clamping devices are secured. Another requirement to be met by clamping devices of this type is that they shall not interfere with a machining or milling operation.

German Patent Publication DE-OS 1,478,857 (Dasser) describes a so-called two-way clamping device that can be operated manually or pneumatically. The known clamping apparatus has a cylindrical housing in which a first hollow piston is guided. The first hollow piston in turn holds in its cylindrical cavity a further piston to which one end of a clamping arm is pivotally secured. A spring is arranged between the further piston holding the clamping arm and the rear end inner wall of the first piston. The clamping arm is guided by a ball-bushing positioned in an end wall of the cylindrical housing so that the clamping arm can pass through the ball while being permitted to perform slight angular movements about the center of the ball and relative to the longitudinal axis of the clamping arm. When pressure, for example pneumatic pressure, is applied to the first piston in the cylindrical housing, the first piston will move within the housing to apply in turn pressure to the spring. As a result, the clamping arm moves together with the piston out of the housing with a movement that is initially linear until the clamping arm contacts the ball-bushing with a shoulder that is part of the clamping arm. At this point the clamping end of the clamping arm, also referred to as the clamping head, is in a position above the work piece. The continued application of pneumatic pressure causes the first piston to keep moving, thereby further compressing the spring inside the hollow first piston. The inner end of the clamping arm is secured in the second piston inside the first piston and the second piston has a longitudinal axis extending at a slant relative to the longitudinal axis of the first piston. This feature of the Dasser clamping device assures that the pressure of the spring applied to the second piston will tilt the clamping arm about the center of the ball-bushing to thereby press the clamping head against the work piece. The inner end of the clamping arm is secured inside the second piston with a journal pin to permit a tilting movement.

The just described clamping apparatus of the prior art requires a substantial structural length and a substantially long piston stroke of the first piston. Moreover, the spring acts against the compressing force applied by the first piston, thereby reducing the compressing force by the spring force which increases the more the spring is compressed. As a result, the clamping force itself is reduced.

OBJECTS OF THE INVENTION

In view of the above it is the aim of the invention to achieve the following objects singly or in combination:

- to construct a clamping device in such a way that the above drawbacks are avoided and to accomplish a short positioning stroke without a spring while providing an optimal clamping force to be applied to a work piece or the like;
- to employ a direct meshing or sliding cooperation of the elements of the clamping device for obtaining an optimally short structural length of the entire device;
- to construct a clamping device in such a way that it is capable of first moving a clamping lever axially and then applying a clamping force in a plane that extends perpendicularly to the axial movement direction namely to the longitudinal axis of the clamping lever;
- to construct certain elements of a clamping device with rotational symmetry relative to a longitudinal axis of a clamping lever for adjusting a clamping head to apply the clamping force in any desired direction radially to said longitudinal axis, and to lock the clamping elements against rotation relative to each other; and
- to provide a clamping head of the clamping device with a surface that adapts itself to an orientation of the surface against which a clamping force is applied.

SUMMARY OF THE INVENTION

The above objects have been achieved according to the invention in a clamping device wherein a housing (1) has a cylindrical bore that is divided by a clamping piston (3) into a first pressure chamber (17) and a second pressure chamber (18) separated from each other by an end wall (3A) of the clamping piston (3). The clamping piston in turn has a dead-end cavity (18A) open to the second pressure chamber (18). The first pressure chamber (17) is closed, preferably by a cover (C). The second pressure chamber (18) is closed by a ball-bushing (4) through which a clamping lever (2) extends in an axially movable manner. The clamping lever (2) reaches with an inner lever end (11) having an axially facing end wall (2A) into the dead-end cavity of the clamping piston (3). The clamping lever (2) extends with an outer end (2B) out of the cylindrical bore through the ball bushing (4) held in a housing end wall (1A) to permit pivoting the clamping lever (2) about the center (M) of the ball bushing (4). For this purpose a first slanted surface (21), for example on-a wedge (5) is arranged in the dead-end cavity of the clamping piston (3). The first slanted surface (21) rises toward an end surface (3B) of the clamping piston end wall (3A) for cooperation with the inner end (11) of the clamping lever (2) which has a second slanted surface (14) in contact with the first slanted surface (21). The clamping force is applied and relieved depending on the cooperation of the first and second slanted surfaces (21, 14), whereby a pressure responsive axial movement of the clamping piston (3) causes the axial and pivoting movement of the clamping lever (2). A cooperation of entraining cams (15, 16) between the clamping piston (3) and the clamping lever (2) limits an axially inward clamping release movement of the lever (2) and piston (3). A cooperation of a shoulder (8) on the lever (2) and an axial face (9) on the ball-bushing limits an outward clamping movement of the lever (2).

Preferably the second slanted surface (14) on the inner end (11) of the clamping lever (2) is formed on a cylindrical pressure pin (13) from which a segment has been removed to form the second slanted surface (14). The pressure pin is rotatably held in a recess (12) in the inner end of the clamping lever (2) so that the second slanted surface (14) on the pin (13) protrudes out of the recess (12) and so that the second slanted surface (14) can adapt its slant to the slant of the first slanted surface (21) which is preferably formed as a wedge surface (21) on which the second slanted surface (14) slides. The cooperation of the just described elements of the invention assures that for the clamping operation the clamping lever first performs a linear motion and then a clamping pivoting motion which extends substantially perpendicularly to the linear motion. Similarly, the clamping lever first performs a pivoting motion in the opposite direction for releasing the clamping force and then a linear motion for moving the clamping lever out of the way. These motions are controlled by admitting fluid under pressure to the respective first and second pressure chambers (17, 18) or respectively releasing fluid under pressure from these chambers.

The above mentioned wedge (5) of a preferred embodiment is rigidly secured inside the dead-end cavity (18A) of the clamping piston (3). Further, by securing the cylindrical, but axially truncated pressure pin (13) rotatably to the inner end of the clamping lever (2), the pin can adapt the slant of its flat surface to the slant of the wedge surface (21) of the wedge (5) even if the wedge (5) is fixed in the piston (3).

Advantages achieved by the invention are seen in that by avoiding the use of a spring, a short axial length of the clamping device is obtained and all components of the clamping device cooperate directly with each other in response to the above mentioned pressure application and pressure release.

Preferably, the pressure release from the second pressure chamber (18) that includes the hollow cavity (18A) of the clamping piston (3) is provided with a throttle (25) for the pressure release to maintain temporarily a certain counter-pressure. In the clamping device of the invention the force effective on the clamping piston is directly transferred to the clamping lever through the first and second slanted surfaces and the clamping head (7) at the outer end of the clamping piston is thus also directly pressed against a work piece. A hydraulic fluid is efficiently used as the pressurized medium. Further, a stop pin (6) that prevents relative rotation between the clamping piston and the clamping lever makes it possible to rotate both components (2 and 3) so that the clamping force exerted by a clamping head attached to the outer end of the clamping lever can be directed in any direction in a plane extending perpendicularly to the longitudinal axis of the clamping lever simply by rotating the clamping lever and clamping piston together inside the housing of the clamping device.

BRIEF DESCRIPTION OF THE DRAWINGS

In order that the invention may be clearly understood, it will now be described, by way of example, with reference to the accompanying drawings, wherein:

FIG. 6 illustrates a top plan view of the present clamping device showing the ports for connecting the housing of the clamping device to a controlled fluid flow circuit not shown;

FIG. 7 shows a perspective view of an insert for an inner end of the clamping lever, wherein the slanting surface of the insert is formed with serrations;

FIG. 7A is a perspective view of a wedge also having a slanted and serrated surface for cooperation with the serrations in the slanted surface of the inner end of the clamping lever; and FIG. 8 shows perspectively a locking device that permits a limited axial movement between the clamping lever and the clamping piston, but prevents relative rotation between the clamping lever and the clamping piston.

DETAILED DESCRIPTION OF PREFERRED EXAMPLE EMBODIMENTS AND OF THE BEST MODE OF THE INVENTION

Figure 1:
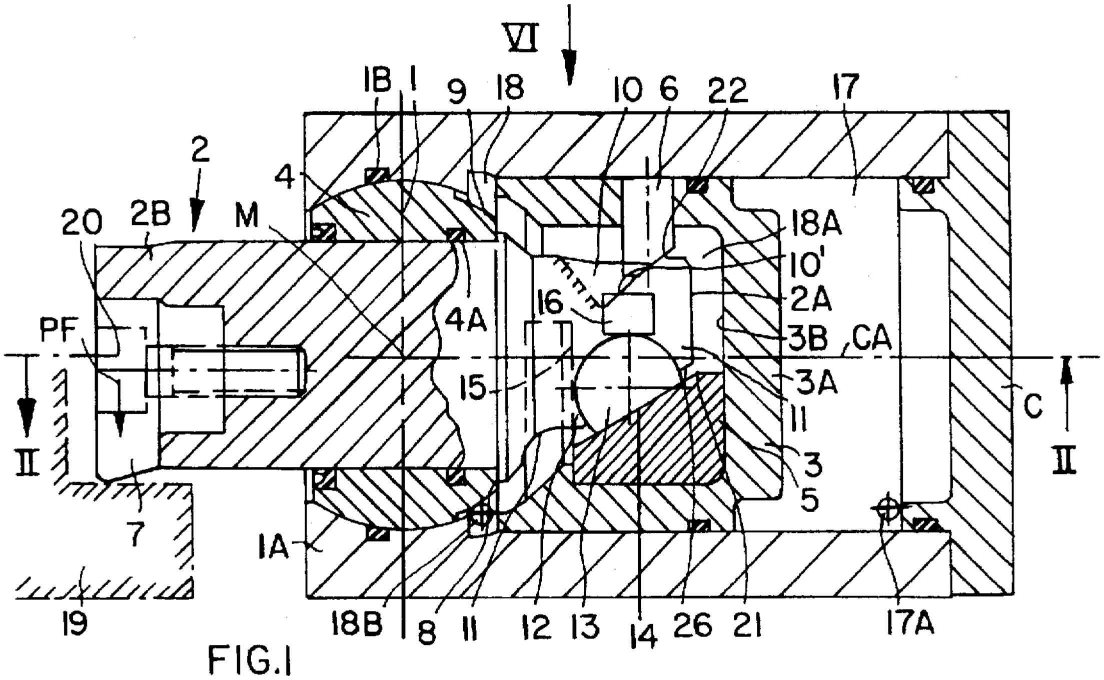
FIG. 1 shows an axial longitudinal section through the clamping element according to the invention illustrating the cooperation of the elements while applying a clamping force.
Figure 2:
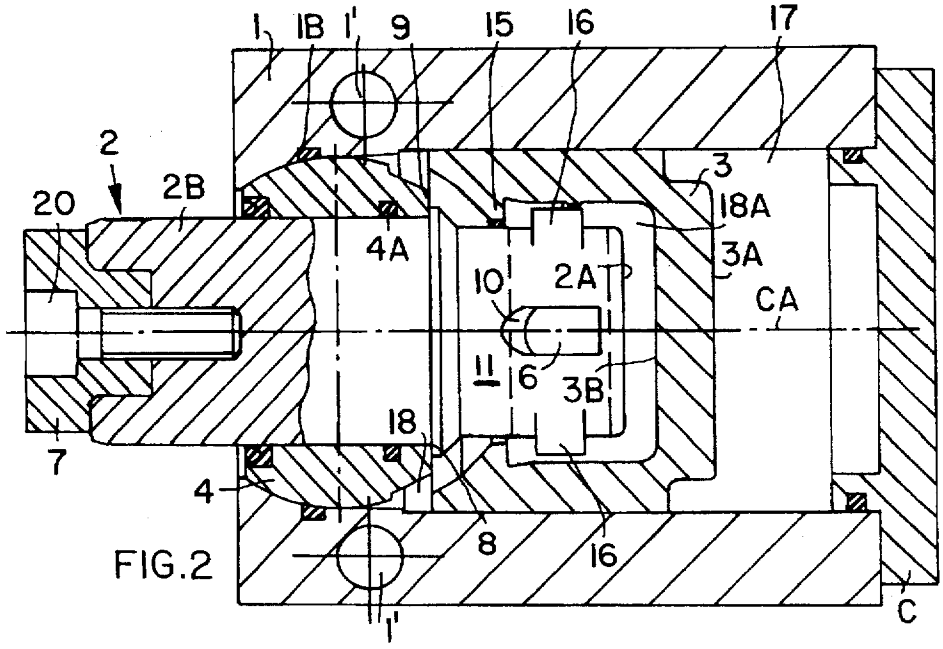
FIG. 2 shows a sectional view along section plane II—II in FIG. 1.

FIGS. 1 and 2 show the present clamping device in a position in which a clamping lever 2 with a clamping head 7 applies a clamping force PF to a work piece 19. The clamping lever 2 is mounted in a housing 1 divided into a first pressure chamber 17 and a second pressure chamber 18 by a clamping piston 3 which drives the clamping lever 2. The chamber 17 is closed by a cover C. The first and second chambers 17 and 18 are separated from each other in a cylindrical axial bore of the housing 1 by rear wall 3A of the clamping piston 3. The clamping piston 3 has an axial dead-end cavity 18A that forms part of the second pressure chamber 18. The clamping lever 2 passes through a ball-bushing 4 so that an inner clamping lever end 11 preferably having a reduced diameter compared to the diameter of an outer lever end 2B, reaches into the cavity 18A of the clamping piston. The larger diameter outer clamping lever end 2B extends out of the ball bushing 4 and carries the clamping head 7 at is preferably exchangeable with the help of a screw 20. The clamping lever 2 is tiltable or pivotable about a center M of the ball-bushing 4 as will be described in more detail below. Preferably, the clamping piston 3 has an outer diameter that is larger than an axial length of the clamping piston 3.

The ball-bushing 4 is mounted in an end wall 1A of the housing 1 provided with a respective spherical shell surface that permits the ball-bushing 4 to pivot together with the clamping lever 2 while simultaneously holding the ball-bushing 4 securely in one end of the housing 1. A seal 1B is provided between the housing 1 and the ball bushing 4.

The clamping lever 2 has a shoulder 8 with a shoulder diameter larger than the inner diameter of the ball-bushing 4. In the position shown in FIGS. 1 and 2 the shoulder 8 bears against a corresponding axially facing shoulder 9 of the ball-bushing 4 to limit the axial outward movement of the lever 2. The inlet opening into the dead-end cavity 18A of the clamping piston 3 is provided with an increased inlet diameter to accommodate the shoulder 8 when the elements are in the position shown in FIGS. 1 and 2. A seal 4A is provided between the clamping lever 2 and the ball-bushing 4.

A first slanted surface 21 is rigidly set in the cavity 18A of the piston 3. A second slanted surface 14 is provided on the inner end 11 of the lever 2.

To the right of the shoulder 8 the inner end 11 of the clamping lever 2 preferably has the above mentioned reduced diameter which in turn is provided with a slanting surface 26. A cylindrical, but truncated recess 12 is provided in the reduced diameter inner end 11 to rotatably hold a pressure pin 13 that forms the second slanted surface 14 extending substantially in parallel to the slanting surface 26 that cuts off or truncates the inner end 11 of the lever 2.

The clamping piston 3 encircles the inner end 11 of the lever 2 so that the axially facing end surface 2A of the inner end of the lever 2 faces the inner end surface 3B of the end wall 3A of the piston 3. Preferably, a wedge 5 is rigidly secured inside the cavity 18A of the piston 3 so that a slanted wedge surface forms the first slanted surface 21 that is rising steadily toward a central longitudinal axis CA and toward the inner end surface 3B. The second slanted surface 14 of the pressure pin 13 is so dimensioned that it engages exactly the first slanted surface 21 of the wedge 5 and to permit a gliding motion of the surface 14 the surface 21 and vice versa. A stop pin 6 with a slanted wedging surface 22 is rigidly secured to the piston 3 to reach into the cavity 18A preferably, but not necessarily, opposite the wedge 5. The pin 6 reaches into a recess 10 of the inner lever end 11 which has a slanted surface 10' cooperating with the slanted wedging surface 22 of the pin 6 to permit a pivoting motion of the lever 2 about the center M of the ball-bushing 4 while simultaneously preventing relative rotation about the longitudinal central axis CA between the piston 3 and the lever 2. Thus, the piston 3 and lever 2 can be rotated about axis CA only in unison. Similarly, the lever 2, the piston 3 and the ball-bushing 4 can be rotated in unison about the axis CA in the housing 1.

Figure 4:
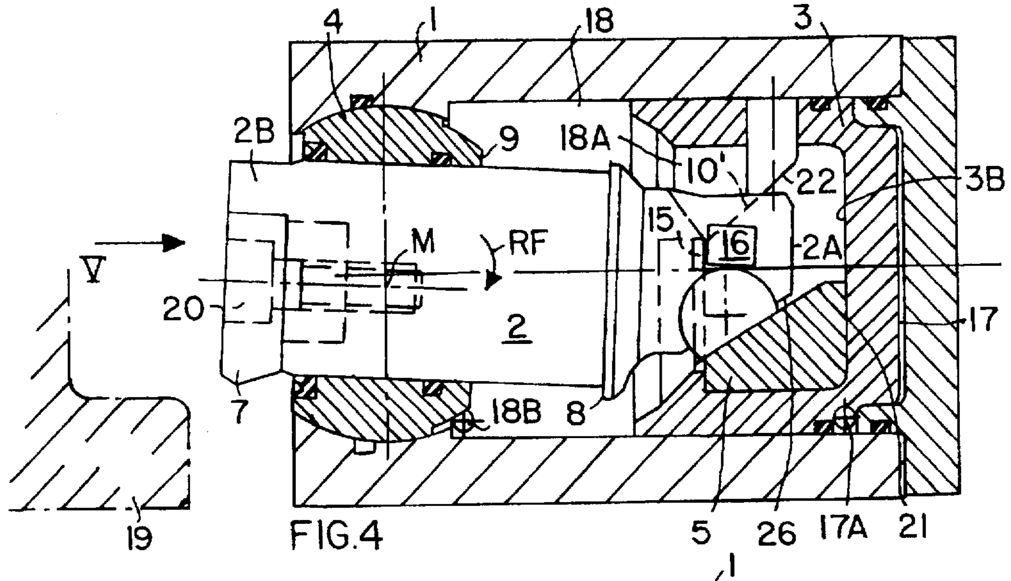
FIG. 4 is a sectional view similar to that of FIG. 1, however illustrating the elements of the clamping device in a released position.

The pin 6 permits the axial movement of the lever 2 in the housing 1 and in the piston 3 so that the piston 3 can move the lever 2 with the relief stroke into an unclamped position shown in FIG. 4. During this release stroke the surfaces 10' and 22 slide on each other axially. The above mentioned rotational locking between the piston 3 and the lever 2 is assured because the recess 10 is a groove in which the pin 6 can move as described and the slanting surface 10' is part of that groove.

Referring to FIG. 2, the piston 3 is provided with a partial shoulder 15 that cooperates with cam or stop lugs 16 rigidly secured to the reduced diameter inner end 11 of the lever 2. When the lugs 16 of the lever 2 engage the shoulder 15 of the piston 3 the rightward movement of the piston 3 pulls the lever 2 into the release position shown in FIG. 4. In this position the clamping lever 2 is moved into the housing 1, except for the clamping head 7, thereby providing convenient access to a workpiece 19. In order to achieve the release movement of the components, pressure is introduced into the chamber 18 through a port 18B shown in FIG. 6. Prior to reaching the position shown in FIG. 4, the pressure build-up in the second chamber 18, 18A is effective on the axially facing end surface 2A of the lever 2, thereby initially pressing the lever 2 with its collar 8 at the beginning of the release movement against the facing surface 9 of the ball-bushing 4. The clamping lever 2 initially remains in this position until the clamping piston 3 has passed through a certain distance in the rightward direction in FIG. 4 away from the clamping lever 2. This motion of the clamping piston 3 is caused by the introduction of fluid under pressure into the second chamber 18, 18A through the part 18B. This pressure is also effective on the inner end surface 3B of the piston 3. As a result, the clamping lever 2 and the clamping piston 3 move away from each other thereby permitting the clockwise pivoting of the lever 2. During this phase of the release operation the slanted surface 14 of the pressure pin 13 slides downwardly on the surface 21 of the wedge 5 while the stays pin 6 causes the clockwise pivoting of the lever 2 about the center M of the ball-bushing 4 in the direction of the arrow RF in FIG. 4, thereby lifting the clamping head 7 off the work piece 19. The stop pin 6 facilitates this clockwise pivoting of the lever 2 in that a slanted surface 22 of the stop pin 6 engages a respective slanted surface 10' in a recess 10 of the inner end 11 of the lever 2.

The clamping piston 3 slides away from the lever 2 until the shoulder 15 engages the stop lugs 16. At this point the clamping piston 3 entrains the clamping lever 2 to move axially into the end position shown in FIG. 4. Since the lever 2 is substantially completely inside the housing 1, except for the clamping head 7, it is now possible to easily remove the work piece 19.

The clamping operation is performed as follows. The first compression chamber 17 is pressurized by fluid under pressure supplied through a port 17A, shown in FIG. 6, whereby the clamping piston 3 is exposed to fluid under pressure on its axially facing end surface 3A. In response to this pressure the clamping piston 3 travels axially left toward the clamping lever 2, whereby simultaneously a throttle 25, shown in FIG. 6, is activated for throttling the outflow of fluid under pressure from the chamber 18, 18A. As a result, a pressure head or counterpressure is temporarily built up in the chamber 18, 18A, thereby applying a pressure to the axially facing end surface 2A of the clamping lever 2, while the contact between the stop cams 16 and the shoulder 15 is initially maintained as shown in FIG. 4. At this point the clamping lever 2 is still in the clockwise rotated position so that the clamping head 7 is in the lifted position shown in FIG. 4. Continued pressurization of the chamber 17 moves the piston 3 and the lever 2 leftwardly with the head 7 elevated above the work piece 19. The synchronized motion of the clamping lever 2 and the piston 3 continues until the shoulder 8 of the lever 2 bears against the facing surface 9 of the ball-bushing 4 as shown in FIG. 1. Thus, the lever 2 stops while the piston 3 continues to move to the left or toward the work piece 19. As a result, the slanted surface 14 of the pressure pin 13 travels upwardly on the slanted surface 21 of the wedge 5, whereby a clamping force PF is applied to the work piece 19 because the lever 2 now turns counterclockwise around the center M as the inner end of the lever 2 is lifted. As soon as the clamping head 7 rigidly engages the work piece 19, the clamping force PF is firmly established and the clamping operation is completed as shown in FIG. 1.

The present clamping device has an advantageously short housing 1 because the cooperation of the elements, especially the lever 2 and the piston 3 is direct and hence can take place in a minimal space. The motion of the lever 2 takes place primarily inside the piston 3 which is so constructed that its diameter can be larger than its axial length.

Figure 3:
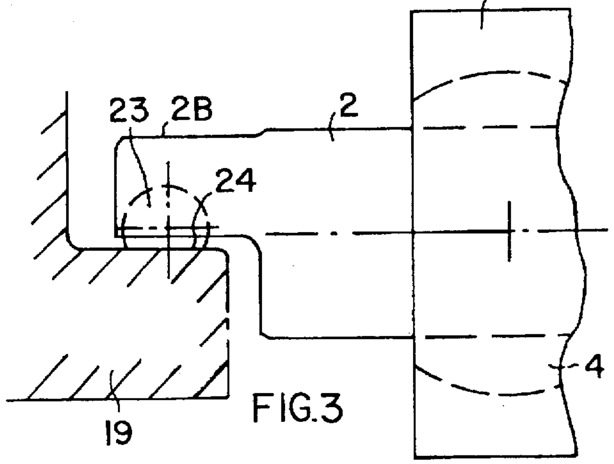
FIG. 3 is a side view similar as in FIG. 1, however illustrating a clamping head with a truncated sphere applying a clamping force to the work piece.

As mentioned, the pressure head 7 may be exchangeably connected to the outer end 2B of the lever 2 by a screw 20. However, any other connections between the clamping head 7 and the lever 2 may be employed. The clamping head 7 may, for example be replaced, as shown in FIG. 3, by a ball-head 23 from which a segment has been cut off to provide a flat surface 24 that can adapt itself to the surface of the work piece 19 because the remaining ball portion is pivotally held inside the left-hand end 2B of the lever 2. The pivoting motion of the lever 2 about the center M does not move the clamping head 7 strictly in a linear motion, yet the flattened ball-head 23 is capable of adapting itself so that the surface 24 will properly engage the surface of the work piece 19 to assure an optimal application of the clamping force PF.

Figure 5:
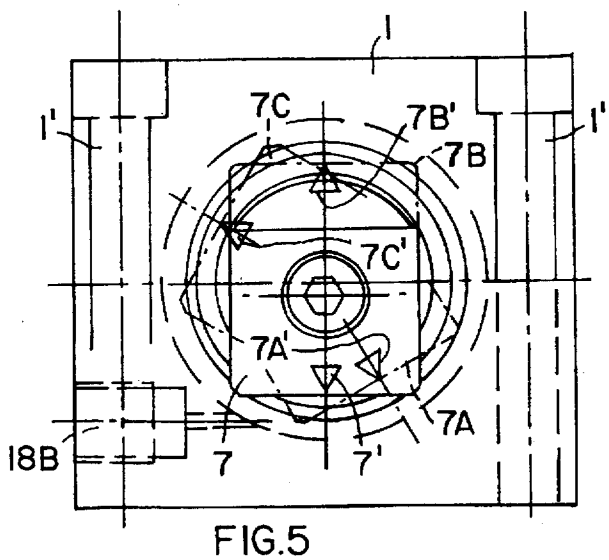
FIG. 5 is a front view in the direction of the arrow V in FIG. 4 for illustrating the possibility of applying a clamping force in any desired angular direction extending radially to a longitudinal axis of the device.

FIG. 5 shows a view in the direction of the arrow V in FIG. 4. The clamping head 7 may assume a plurality of positions 7A, 7B, and 7C, for example. Thus, it is possible to direct the clamping force PF as indicated by the arrow heads 7', 7A', 7B', and 7C'.

These arrowheads representing the respective clamping forces extend in a plane extending perpendicularly to the longitudinal or central axis CA of the clamping device.

The above described angular adjustment is possible because both components, the lever 2 and the piston 3, are held together in a manner rigid against relative rotation between the lever and the piston. As a result, both components, the piston 3 and the lever 2, are rotatable together about the central axis CA. The wedge 5 and the stop pin 6 are rigidly secured to the piston 3. The pin 6 extends radially into the piston and thus the lever 2 can move axially and pivotally relative to the piston, but not rotationally because the pin 6 is guided in the recess 10, whereby the surfaces 10' and 22 shown in FIGS 1 and 22 cooperate with each other with regard to the pivoting of the lever 2 as described above, while still assuring that the lever 2 and the piston 3 perform all rotations about the central axis CA in unison. The above described seals 4A and 1B permit the rotation, not only of the lever 2 and piston 3 in unison, but also of the ball-bushing 4 inside the housing 1, preferably in unison with the lever 2 and piston 3. Thus, all components 2, 3, 4 mounted inside the housing 1 are rotatable in unison about the axis CA. The adjustment of the clamping head 7 in any angular position through a 360° angular range about the axis CA is accomplished simply by rotating the head 7 in the desired direction until the clamping head 7 has reached the desired angular position.

The just described angular adjustment possibility has yet another advantage, namely when the work piece 19 has a clamping surface that is not parallel to the clamping head 7. In that case the clamping head 7 is capable to angularly adjust its position to the surface of the work piece. The application of the clamping force PF makes sure that the clamping head 7 always automatically assumes the most efficient position for the application of the clamping force PF in the required direction.

It has been found in practice, that an increase in the friction between the first and cooperating second surfaces, namely the slanted surface 21 of the wedge 5 and the slanted surface 14 of the pressure pin 13, improves the force transmission between the piston and the lever and provides an improved self-locking between these components to the extent necessary. For this purpose a preferred embodiment of the invention provides the surfaces 21 and 14 with tongue and groove features. The resulting tongues and grooves intermesh with each other, thereby increasing the frictional surface area approximately three times to that of plane surfaces 14 and 21.

FIG. 7 shows a pressure pin 13' provided with a serrated surface 14' having valleys 27 and ridges 29 which extend in the direction of the required sliding motion. FIG. 7A shows a modified wedge 5' having a sliding surface 21' with valleys 28 and ridges 30 also extending in the sliding direction. The ridges and valleys mesh with the respective valleys and ridges of the pressure pin 13'. The ridges and valleys are so dimensioned that they slide along each other. The pressure pin 13' is rotatably secured to the inner end of the lever 2 as described above so that the just mentioned intermeshing provides the required axial displacement of the lever 2 as described while also permitting the pivoting motion.

The clamping lever 2 is guided inside the housing 1 by the ball-bushing 4 and inside the clamping piston 3, which in turn is guided inside the cylindrical bore of the housing 1, whereby the guide and stop pin 6 engaging the recess 10 in the inner end of the lever 2 assists in such guiding even when the lever performs the above described pivoting motion, whereby the slanted surface 22 of the pin 6 engages the surface 10' and the cooperation of these two surfaces 10' and 22 facilitates the pivoting motion during the release movement of the lever 2. It has been found, that this guiding of the lever 2 inside the piston 3 can be further improved when the surface of the recess and the surface of the guide pin remain interengaged at all times.

Referring to FIG. 8, a guide and stop pin 6' is provided according to the invention with a semispherical end surface 31 conformed to a slide surface 33 in an elongated hole or groove 32 of the lever 2'. The slide surface 33 has a cross-sectional configuration conforming to a parabola and such configuration is determined by the sliding motions of the surfaces 33 and 31 on each other during the clamping and release motions of the pressure pin 13 with its surface 14 on the slanted surface 21 of the wedge 5. As the semispherical surface 31 engages the surface 33 in the elongated hole 32, the semispherical surface 31 of the pin 6' is guided in such a way that the contact between the valleys 27 and the ridges 30 and the contact between the valleys 28 and the ridges 29 remain constant in both movement directions, namely the release movement and the clamping movement, whereby the axial and pivoting movement of the lever 2' is positively guided while any relative rotation between the clamping lever and the clamping piston is prevented.

Incidentally, the housing 1 is provided with holes 1', as shown in FIGS. 2, 5, and 6 for securing the housing to a support not shown.

Although the invention has been described with reference to specific example embodiments, it will be appreciated that it is intended to cover all modifications and equivalents within the scope of the appended claims.

What is claimed is:

1. A clamping device for securing a first component to a second component, comprising a housing (1), an end wall (1A) and a cylindrical axial bore in said housing, a clamping piston (3) axially movable in said axial bore, said clamping piston comprising an axial dead-end cavity (18A) and an end wall (3A) dividing said axial bore into a first pressure chamber (17) and a second pressure chamber (18), said dead-end cavity (18A) communicating with said second pressure chamber (18), a clamping lever (2) having an inner end (11) reaching inside said dead-end cavity (18A) and an outer end (2B) for applying a clamping force (PF), a ball-bushing (4) pivotally mounted in said end wall (1A) of said housing (1), said ball-bushing (4) having a center (M), said clamping lever (2) extending in an axially slidable manner through said ball-bushing (4) for pivoting about said center (M), a first slanted wedge surface (21) in a fixed position inside said dead-end cavity (18A) of said clamping piston (3) so that said first slanted wedge surface (21) is movable in unison with said clamping piston (3), a second slanted surface (14) at said inner end of said clamping lever (2) for cooperation with said first slanted surface (21) in response to relative axial movement between said clamping lever (2) and said clamping piston (3) for pivoting said clamping lever (2) about said center (M) to apply or release a clamping force depending on a pivoting direction, and fluid pressure ports (17A, 18B) in said housing for axially moving said clamping piston (3) and said first slanted wedge surface (21) together in said housing.

2. The clamping device of claim 1, further comprising a wedge (5) rigidly secured inside said dead-end cavity (18A) to form said first slanted surface (21), and an insert (13) movably secured to said inner end (21) of said clamping lever for forming said second slanted surface (14) extending with the same slant as said first slanted surface.

3. The clamping device of claim 2, wherein said insert (13) is a cylindrical body with a segment cut-off in parallel to a longitudinal cylinder axis to form said second slanted surface (14), and wherein said inner end (11) of said clamping lever (2) has a recess (12) in which said insert (13) is movably held with said second slanted surface (14) protruding into sliding contact with said first slanted surface (21).

4. The clamping device of claim 1, wherein said end wall (3A) of said clamping piston (3) has an inner end surface (3B) at one end of said clamping piston (3) and an opening at the opposite end, said slanted first and second surfaces (21, 14) rising steadily from said opening to said inner end surface (3B).

5. The clamping device of claim 1, wherein said clamping lever (2) comprises a collar (8) around said inner end of said clamping lever (2) in said second pressure chamber (18), wherein said ball-bushing (4) has an axially facing surface (9) for cooperating with said collar (8) in limiting an axial outward movement of said clamping lever (2), said inner end of said clamping lever (2) further comprising a reduced diameter section (11) having a third slanted surface (26) positioned opposite said first slanted surface (21), a recess (12) formed in said third slanted surface (26), and an insert (13) in said recess (12), said insert (13) having a flat surface forming said second slanted surface (14).

6. The clamping device of claim 1, further comprising a stop and guide pin (6) rigidly secured to said clamping piston (3) in said dead-end cavity, said stop and guide pin (6) having an inclined surface (22), said inner end of said clamping lever (2) comprising a recess (10) forming a guide groove with a respectively inclined surface (10') cooperating with said stop and guide pin (6) for permitting pivoting movement of said clamping lever (2) and relative axial movement between said clamping lever and clamping piston while stopping relative rotational movement between said clamping lever and clamping piston so that said clamping lever (2) and said clamping lever (3) can rotate in unison.

7. The clamping device of claim 6, wherein said clamping piston (3) has a cylindrical wall and wherein said stop and guide pin (6) is mounted inside said clamping piston (3) to said cylindrical wall to reach into said dead-end cavity (18A).

8. The clamping device of claim 1, wherein said clamping piston (3) comprises a radially inwardly extending shoulder (15) and said clamping lever (2) comprises a stop cam or lug (16) on its inner end (11) for cooperation with said shoulder (15) for entraining said clamping lever (2) with an axial motion of said clamping piston (3).

9. The clamping device of claim 1, further comprising fluid flow ports (17A, 18') in said housing (1) each, communicating with a respective one of said first and second pressure chambers, and a fluid flow throttle (25) connecting said second pressure chamber (18, 18A) to the respective fluid flow port, whereby said throttle (25) maintains a certain pressure head or counterpressure in said second pressure chamber (18, 18A) at least during an initial phase of a clamping operation.

10. The clamping device of claim 9, further comprising a collar (8) secured to said inner end (11) of said clamping lever, an axially facing surface (9) on said ball-bushing (4) for cooperation with said collar (8), wherein during said clamping operation said pressure head or counterpressure in said second pressure chamber (18, 18A) permits an axial movement of said clamping lever (2) in its clockwise pivoted position, until said collar (8) of said clamping lever (2) bears against said axially facing surface (9) of said ball-bushing (4), and wherein a further axial movement of said clamping piston (3) toward said ball-bushing causes a sliding cooperation of said first and second slanted surfaces (21, 14) for pivoting said clamping lever counter-clockwise about said center (M) of the ball-bushing (4) to move said inner lever end counterclockwise for applying said clamping force (PF).

11. The clamping device of claim 1, wherein said clamping lever (2) is rotatable about a longitudinal central axis (CA) in unison with said ball-bushing (4) and in unison with said piston (3) inside said cylindrical axial bore of said housing (1).

12. The clamping device of claim 9, wherein said counterpressure in said second pressure chamber (18, 18A) is relieved in response to a clamping operation caused by a motion of said clamping piston (3) by a respective hydraulic fluid flow.

13. The clamping device of claim 1, wherein each of said first slanted surface (21) and said second slanted surface (14) comprises longitudinal grooves (27, 28) and longitudinal ridges (29, 30), and wherein ridges of one slanted surface are laterally displaced relative to ridges of the other slanted surface so that said ridges and grooves intermesh with each other while permitting a longitudinal sliding movement of said first and second slanted surfaces (21, 14) relative to each other.

14. The clamping device of claim 1, further comprising a stop and guide pin (6') secured to said clamping piston to reach into said dead-end cavity (18A), said stop and guide pin (6') having a semispherical end section (31), and wherein said clamping lever (2') comprises a longitudinal groove (32) for cooperation with said stop and guide pin (6'), said groove (32) having a curved slide surface (33) on which said semispherical end section (31) is slidingly guided, and wherein a curvature of said slide surface (33) is so formed and dimensioned that during all motions of said clamping lever (2) sliding contact between said first and second slanted surfaces (21, 14) is maintained.

15. The clamping device of claim 1, wherein said clamping piston (3) has an outer diameter that is larger than an axial length of said clamping piston (3).

* * * * *

UNITED STATES PATENT AND TRADEMARK OFFICE

CERTIFICATE OF CORRECTION

PATENT NO. : 5,746,420

DATED : May 5, 1998

INVENTOR(S) : Kohlert

It is certified that error appears in the above-identified patent and that said Letters Patent is hereby corrected as shown below:

Col. 4, line 39, after "by" insert --a--;
line 48, after "head 7" replace "at" by --that--.

Col. 6, line 10, after "the" (first occurrence) replace "stays" by --stop--.

Signed and Sealed this

Twenty-seventh Day of October, 1998

Attest:

Bruce Lehman

BRUCE LEHMAN

*Attesting Officer* *Commissioner of Patents and Trademarks*